US012747101B2

(12) United States Patent
Ukisu et al.

(10) Patent No.: US 12,747,101 B2
(45) Date of Patent: Sep. 29, 2026

(54) TRANSFER SYSTEM

(71) Applicant: DAIFUKU CO., LTD., Osaka (JP)

(72) Inventors: Kenichi Ukisu, Tokyo (JP); Atsushi Minoo, Tokyo (JP)

(73) Assignee: DAIFUKU CO., LTD., Osaka (JP)

( * ) Notice: Subject to any disclaimer, the term of this patent is extended or adjusted under 35 U.S.C. 154(b) by 161 days.

(21) Appl. No.: 18/867,937

(22) PCT Filed: Mar. 16, 2023

(86) PCT No.: PCT/JP2023/010236
§ 371 (c)(1),
(2) Date: Nov. 21, 2024

(87) PCT Pub. No.: WO2023/233755
PCT Pub. Date: Dec. 7, 2023

(65) Prior Publication Data
US 2026/0184505 A1 Jul. 2, 2026

(30) Foreign Application Priority Data
May 31, 2022 (JP) ................................ 2022-089015

(51) Int. Cl.
*B65G 1/04* (2006.01)
*B65G 47/91* (2006.01)

(52) U.S. Cl.
CPC ......... *B65G 1/0485* (2013.01); *B65G 47/912* (2013.01)

(58) Field of Classification Search
CPC .............................. B65G 47/91; B65G 1/0485
USPC ........................................................ 198/436
See application file for complete search history.

(56) References Cited

U.S. PATENT DOCUMENTS

| | | | | |
|---|---|---|---|---|
| 9,751,693 | B1 | 9/2017 | Battles et al. | |
| 9,950,863 | B2 * | 4/2018 | O'Brien ............... | B65G 1/1373 |
| 2018/0057264 | A1 | 3/2018 | Wicks et al. | |
| 2021/0188554 | A1 | 6/2021 | Kalouche et al. | |

(Continued)

FOREIGN PATENT DOCUMENTS

| | | | |
|---|---|---|---|
| CN | 106531491 | * | 3/2017 |
| CN | 206312778 | * | 7/2017 |
| CN | 111115163 A | | 5/2020 |

(Continued)

OTHER PUBLICATIONS

International Search Report and Written Opinion for PCT/JP2023/010236 and its English translation thereof mailed May 30, 2023.

(Continued)

*Primary Examiner* — Gene O Crawford
*Assistant Examiner* — Lester Rushin, III
(74) *Attorney, Agent, or Firm* — Harness, Dickey & Pierce, P.L.C.

(57) ABSTRACT

This invention improves workability in manual transfer in which an article is transferred by an operator. A transfer system (100) includes a transfer unit (3) for transferring, to a second transfer position (P21), an article (W) transferred to a first transfer position (P11), and changes a first transfer position (P11) for automatic transfer in which the article (W) is transferred by the transfer unit (3) and a first transfer position (P12) for manual transfer in which the article (W) is transferred by an operator (H).

7 Claims, 9 Drawing Sheets

(56) References Cited

U.S. PATENT DOCUMENTS

| | | | | |
|---|---|---|---|---|
| 2021/0245967 | A1* | 8/2021 | Kiyokawa ............ | B65G 1/1378 |
| 2021/0394364 | A1 | 12/2021 | Ogawa et al. | |

FOREIGN PATENT DOCUMENTS

| | | | |
|---|---|---|---|
| CN | 113291682 | A | 8/2021 |
| CN | 113978988 | A | 1/2022 |
| JP | 2004-231303 | A | 8/2004 |
| JP | 2015-40121 | A | 3/2015 |
| JP | 2017-165991 | A | 9/2017 |
| JP | 2019-43698 | A | 3/2019 |
| JP | 2019-137543 | A | 8/2019 |
| JP | 2021-127198 | A | 9/2021 |
| JP | 2022-1513 | A | 1/2022 |
| WO | 2017/110499 | A1 | 6/2017 |
| WO | 2020/066885 | A1 | 4/2020 |

OTHER PUBLICATIONS

Japanese Decision of Dismissal of Amendmentand English translation thereof for Japanese Application No. 2022-089015 mailed Nov. 26, 2024.
Japanese Office Action and English translation thereof for Japanese Application No. 2022-089015 mailed Aug. 27, 2024.
Japanese Office Action and English translation thereof for Japanese Application No. 2022-089015 mailed Jun. 11, 2024.
Office Action dated May 8, 2026 issued in Taiwanese patent application No. 112110165.

* cited by examiner

TRANSFER SYSTEM

TECHNICAL FIELD

The present invention relates to a transfer system for an article in logistics.

BACKGROUND ART

Conventionally, in logistics warehouses and the like, a transfer system including a picking device (transfer device) such as a robot arm is used to efficiently sort a wide variety of and a large amount of articles for containers-for-shipping according to shipping destinations. With regard to this type of transfer system, Patent Literature 1 discloses a configuration that secures a working area by retracting a part of a conveyor at the time of switching from an automatic transfer operation in which an article is transferred by a picking device to a manual transfer operation in which an article is transferred by an operator.

CITATION LIST

Patent Literature 1

Japanese Patent Application Publication, Tokukai, No. 2017-165991

SUMMARY OF INVENTION

Technical Problem

For the above-described transfer system that carries out the automatic transfer operation and the manual transfer operation, there has been a demand for development of a technique for improving the workability in the manual transfer.

An aspect of the present disclosure was made in light of the above-described problem, and has an object to improve the workability in the manual transfer in which an article is transferred by an operator.

Solution to Problem

In order to attain the above object, a transfer system in accordance with an aspect of the present disclosure includes: a first delivery section configured to deliver an article to a first transfer position; a transfer unit configured to transfer, to a second transfer position, the article having been delivered to the first transfer position; a second delivery section configured to deliver the article having been transferred to the second transfer position; and a transfer position changing section configured to change at least one of the first and second transfer positions in switching between (i) automatic transfer in which the article is transferred by the transfer unit and (ii) manual transfer in which the article is transferred by an operator.

Advantageous Effects of Invention

According to an aspect of the present disclosure, it is possible to improve the workability in the manual transfer in which an article is transferred by an operator.

DESCRIPTION OF EMBODIMENTS

Figure 1:
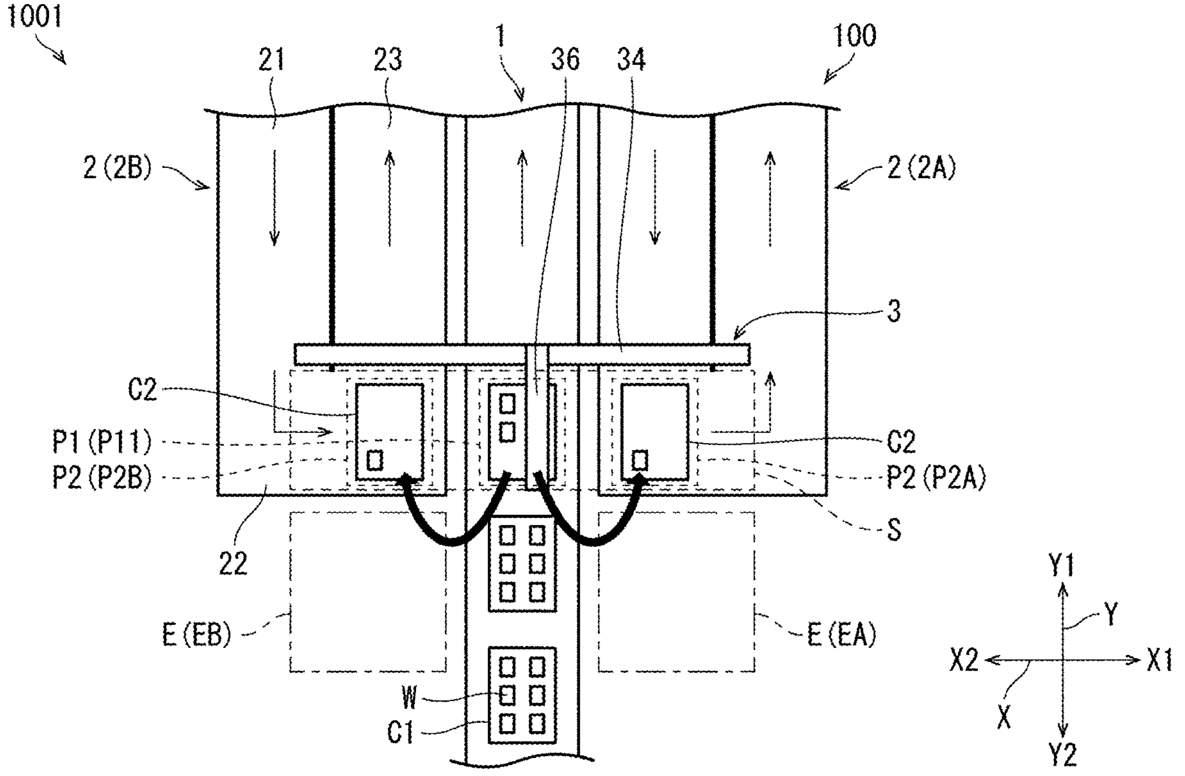
FIG. 1 is a plan view of a transfer system in accordance with an embodiment of the present invention.
Figure 1:
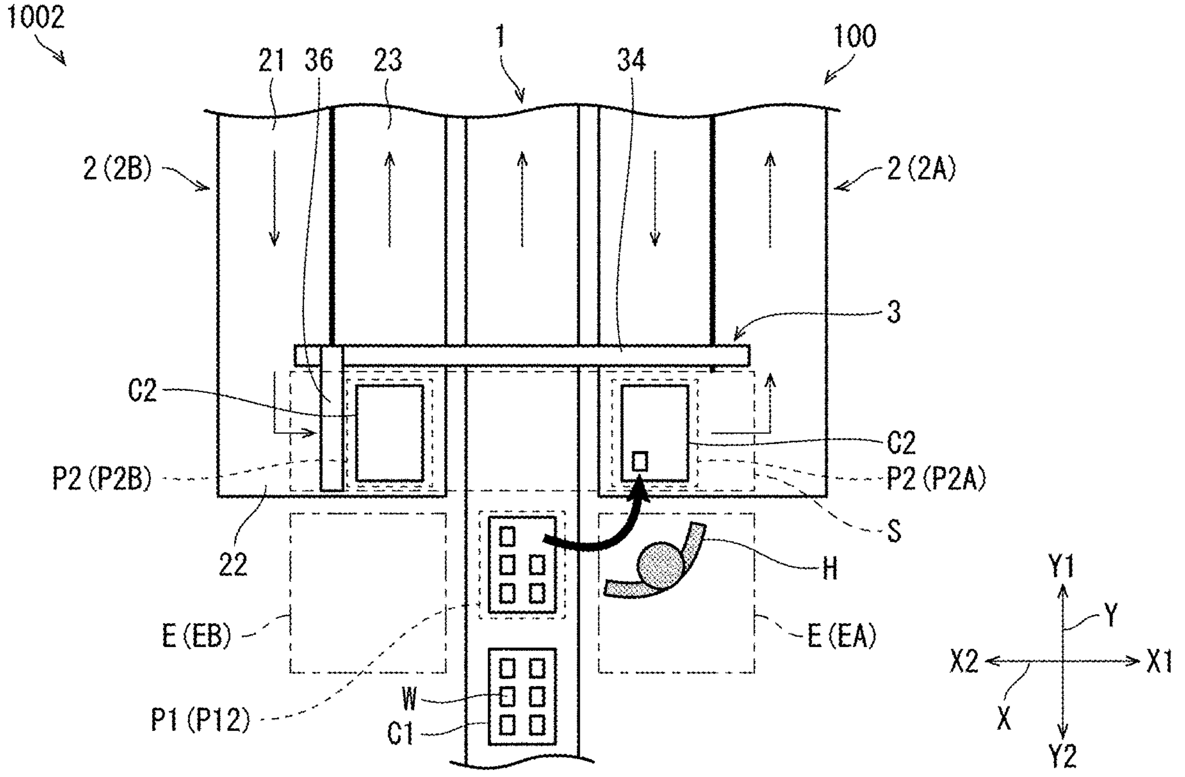

The following will describe an embodiment of the present disclosure with reference to FIGS. 1 to 4. Note, however, that the following description discusses one example of a transfer system in accordance with the present invention, and the technical scope of the present invention is not limited to examples in the drawings.

[Overview of Transfer System 100]

Figure 2:
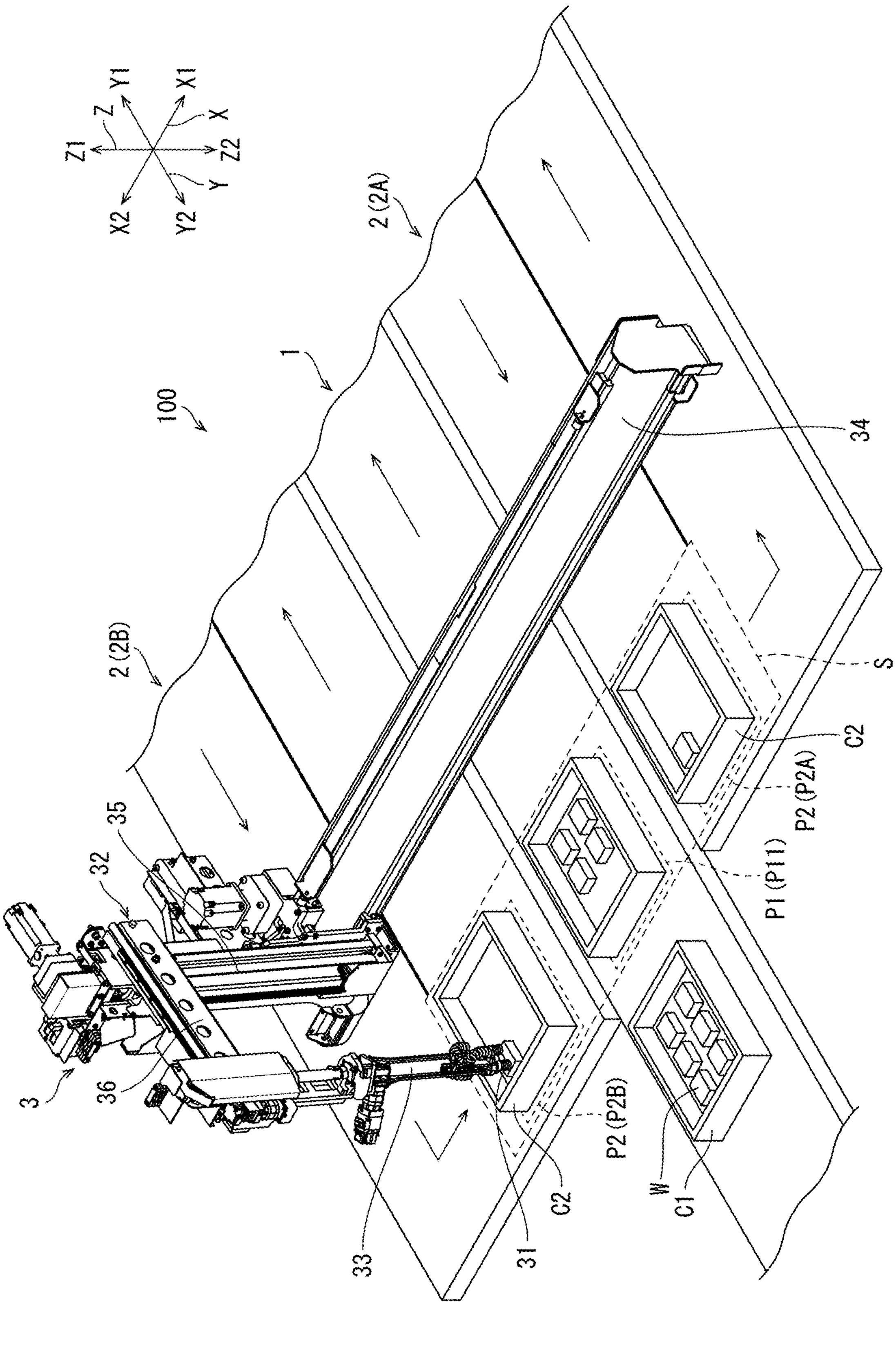
FIG. 2 is a perspective view illustrating a transfer unit included in the transfer system.

First, the following will describe, with reference to FIGS. 1 and 2, an overview of a transfer system 100 in accordance with the present embodiment. FIG. 1 is a plan view of the transfer system 100 in accordance with the present embodiment. 1001 of FIG. 1 illustrates an operation state during automatic transfer, whereas 1002 of FIG. 1 illustrates an operation state during manual transfer. The transfer system 100 is used in, e.g., a logistics warehouse or the like in order to efficiently sort a wide variety of and a large amount of articles for containers-for-shipping according to shipping destinations.

The transfer system 100 includes a transfer unit 3 which transfers, to a second transfer position P2, an article W having been delivered to a first transfer position P11. The transfer system 100 is capable of switching between (i) automatic transfer operation in which an article W is transferred by the transfer unit 3 and (ii) manual transfer operation in which an article W is transferred by the operator H. As shown in 1001 and 1002 of FIG. 1, at the time of switching from the automatic transfer operation to the manual transfer operation, the transfer system 100 changes the first transfer position P11 (see 1001 of FIG. 1) for the automatic transfer to a first transfer position P12 (see 1002 of FIG. 1) for the manual transfer, the first transfer position P12 being farther away from the transfer unit 3 than the first transfer position P11 is. Consequently, the transfer unit 3 is not present at a location above a first container C1 located at the first transfer position P12. Thus, the transfer unit 3 would not hinder the operator H from taking the article W out of the first container C1, which can improve the workability in the manual transfer.

[Configuration of Transfer System 100]

Figure 3:
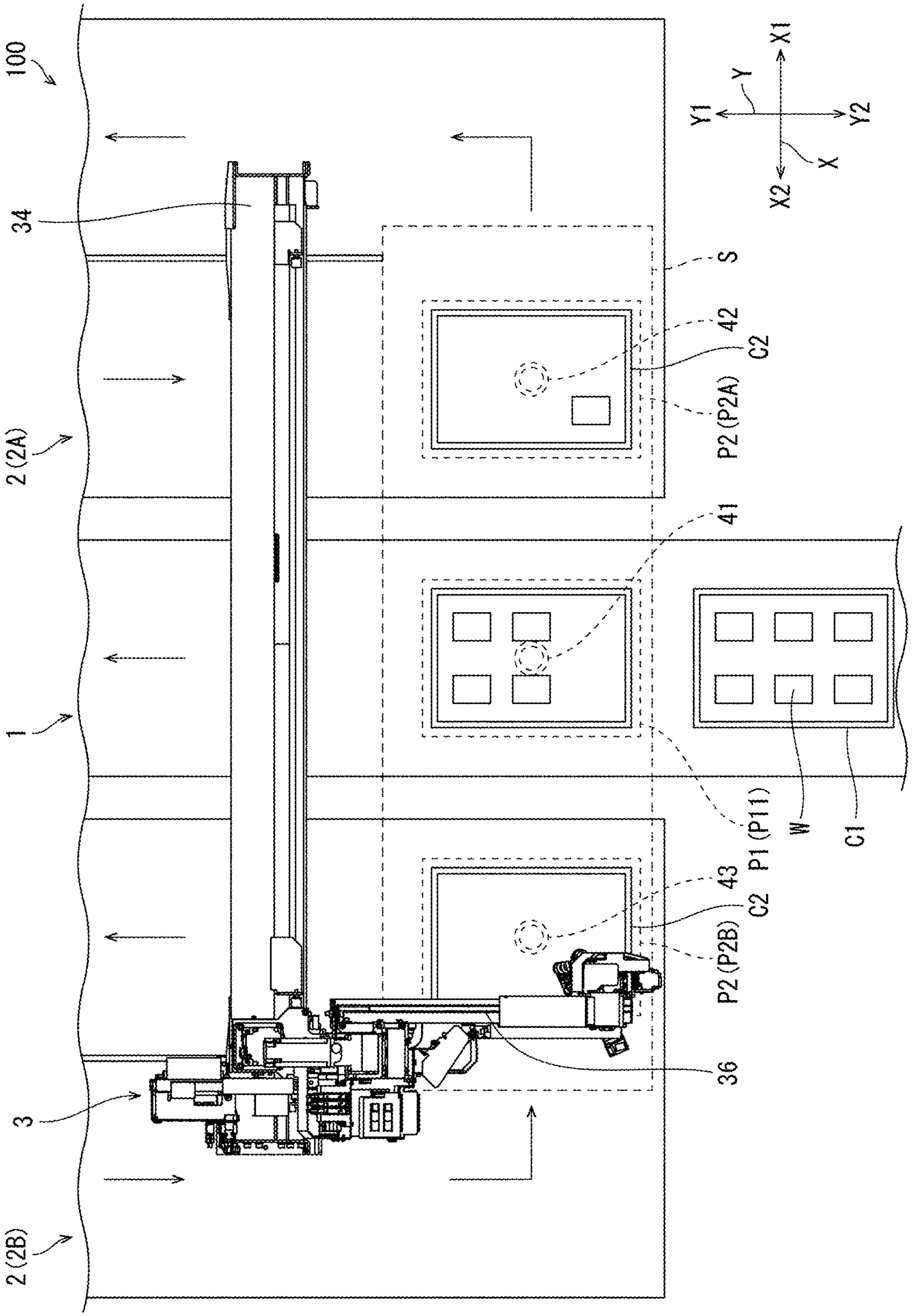
FIG. 3 is a plan view of the transfer unit.

Next, the following will describe a configuration of the transfer system 100 in accordance with the present embodiment with reference to FIGS. 1 to 3. As shown in 1001 and 1002 of FIG. 1, the transfer system 100 includes: a first conveyor (first delivery section) 1 configured to deliver the first container C1 having an article W housed therein; a second conveyor (second delivery section) 2 configured to deliver a second container C2; and the transfer unit 3 configured to transfer the article W from the first container C1 to the second container C2.

The transfer system 100 delivers, by the first conveyor 1, a first container C1 having an article(s) W housed therein from an automatic warehouse (not illustrated) to the first transfer position P1, and transfers the article(s) W to a second container C2 for shipping which has been delivered to the second transfer position P2 by the second conveyor 2. As a result, articles W are sorted for second containers C2 for respective shipping destinations. The second containers C2 to which the articles W have been sorted are delivered to a subsequent process by the second conveyor 2. Then, the articles W are packed and given transmittal letters, and thereafter are shipped to the shipping destinations. The following description will discuss configurations of respective sections of the transfer system 100.

In the following description, a "Y direction" refers to a direction along which the first conveyor 1 extends, a "Y1 direction" refers to a delivery direction of the first conveyor 1 in the Y direction, and a "Y2 direction" refers to a direction reverse to the Y1 direction. An "X direction" refers to a direction orthogonal to the Y direction in a plan view, an "X1 direction" refers to one direction (a rightward direction in FIG. 1) of the X direction, and an "X2 direction" refers to a direction reverse to the X1 direction.

(First Conveyor 1)

The first conveyor 1 is constituted by any of various delivery devices such as a roller conveyor and a belt conveyor. As indicated by the arrows in 1001 and 1002 of FIG. 1, the first conveyor 1 is provided along the Y direction, and delivers, in the Y1 direction, a first container C1 having an article W housed therein. The first container C1 delivered to the first transfer position P1 by the first conveyor 1 has at least one article W housed therein. For example, article(s) W of the same type is/are housed in a single first container C1.

The first transfer position P1 is set in a middle of a delivery path of the first conveyor 1. Specifically, the first transfer position P11 at which the first container C1 stops during the automatic transfer is set at a location below the transfer unit 3. The first transfer position P12 at which the first container C1 stops during the manual transfer is set at a location downstream of the first transfer position P11 in the delivery direction of the first conveyor 1, that is, on the Y2 direction side. The first transfer position P11 is set at a location adjacent to the second transfer position P2 in the X direction. The first transfer position P12 is set at a location obliquely adjacent to the second transfer position P2.

During the automatic transfer illustrated in 1001 of FIG. 1, the first conveyor 1 causes the first container C1 delivered from the automatic warehouse to stop at the first transfer position P11. Then, after a desired number of article(s) W is/are taken out of the first container C1 by the transfer unit 3, the first conveyor 1 delivers the first container C1 from the first transfer position P11 to the automatic warehouse. Meanwhile, during the manual transfer illustrated in 1002 of FIG. 1, the first conveyor 1 causes the first container C1 delivered from the automatic warehouse to stop at the first transfer position P12. Then, after a desired number of article(s) W is/are taken out of the first container C1 by the operator H, the first conveyor 1 delivers the first container C1 from the first transfer position P12 to the automatic warehouse.

(Second Conveyor 2)

The second conveyor 2 is constituted by any of various delivery devices such as a roller conveyor and a belt conveyor. As indicated by the arrows in 1001 and 1002 of FIG. 1, second conveyors 2 are respectively provided on two opposite sides of the first conveyor 1 so that one second conveyor 2 is provided on each of the sides. Specifically, the second conveyors 2 include: a second conveyor 2A provided so as to be adjacent to the first conveyor 1 on the X1 direction side; and a second conveyor 2B provided so as to be adjacent to the first conveyor 1 on the X2 direction side. The second conveyor 2A and the second conveyor 2B are identical in structure, and are provided in the same position in the Y direction across the first conveyor 1.

As indicated by the arrows in 1001 and 1002 of FIG. 1, the second conveyor 2 includes: a first portion 21 for delivering a second container C2 in the Y2 direction; a second portion 22 for delivering the second container C2 in the X1 direction; and a third portion 23 for delivering the second container C2 in the Y1 direction. The first portion 21 and the third portion 23 are provided along the Y direction so as to be adjacent to each other. The second portion 22 is provided along the X direction at a location closer to parts of the first portion 21 and the third portion 23 which parts are on the Y2 direction side, so that the first portion 21 and the second portion 22 are connected to each other. In this manner, the first portion 21 and the second portion 22 are connected to each other at an angle of 90 degrees, and the second portion 22 and the third portion 23 are connected to each other at an angle of 90 degrees. Thus, a delivery path of the second conveyor 2 makes a turn of 180 degrees, specifically, 90 degrees at each of Y2-direction-side end portions where the second portion 22 is provided.

The second transfer position P2 is set in a middle of the delivery path of the second conveyor 2. Specifically, a second transfer position P2A is set in the second portion 22 of the second conveyor 2A. A second transfer position P2B is set in the second portion 22 of the second conveyor 2B. These second transfer positions P2A and P2B are set at locations that are below the transfer unit 3 and are adjacent to two opposite sides of the first transfer position P11 in the X direction across the first transfer position P11. Specifically, the second transfer position P2A is set on the X1 direction side of the first transfer position P11, whereas the second transfer position P2B is set on the X2 direction side of the first transfer position P11.

As shown in 1001 and 1002 of FIG. 1, during each of automatic transfer and manual transfer, the second conveyor 2 delivers a second container C2 supplied from a second container supply station (not illustrated) and causes the second container C2 to stop at the second transfer position P2. Then, after an article(s) W from the first container C1 is housed therein by the transfer unit 3, the second conveyor 2 delivers the second container C2 from the second transfer position P2 to a subsequent process. Note that the second container C2 which is delivered to the second transfer position P2 by the second conveyor 2 has no article W housed therein. Meanwhile, the second container C2 delivered from the second transfer position P2 to the subsequent process has one kind of article W or two or more kinds of articles W stored therein, the article(s) W having been transferred thereto by the transfer unit 3 or the operator H.

(Transfer Unit 3)

The transfer unit 3 is provided just above the first transfer position P11 and the second transfer positions P2A and P2B. The transfer unit 3 is provided upward of (i) an upper end of a first container C1 at the first transfer position P11 and (ii) upper ends of second containers C2 at the second transfer positions P2A and P2B. The transfer unit 3 is provided to lay across the first transfer position P11 and the second transfer positions P2A and P2B, which are provided on the two opposite side of the first transfer position P11. The transfer unit 3 holds articles W housed in the first container C1 located at the first transfer position P11, and transfers the articles W to the second containers C2 located at the second transfer positions P2A and P2B.

FIG. 2 is a perspective view of the transfer unit 3. Meanwhile, FIG. 3 is a top view of the transfer unit 3. In the description below, a "Z direction" refers to a direction substantially perpendicular to the X direction and the Y direction, a "Z1 direction" refers to a direction in which a picking head 31 raises in the Z direction, and a Z2 direction refers to a direction reverse to the Z1 direction.

As shown in FIG. 2, the transfer unit 3 includes: the picking head 31 configured to hold an article W; and a driving section 32 configured to raise and lower the picking head 31 in the Z direction and to cause the picking head 31 to move in two directions, that is, the X direction and the Y direction in a plan view. The transfer unit 3 is provided to a frame or the like (not illustrated).

The picking head 31 is constituted by, e.g., one or more suction pads configured to suck and stick to an article W. The picking head 31 is attached to a lower portion (on the Z2 direction side) of a support arm 33 extending along the Z direction. The picking head 31 sucks and sticks to an article W in the first container C1 from above, so as to hang the article W.

The driving section 32 includes: a fixed rail 34 which is provided along the X direction; a first movable rail 35 which is provided along the Z direction and which is movable in a reciprocating manner in the X direction along the fixed rail 34; and a second movable rail 36 which is provided along the Y direction and which is movable in a reciprocating manner in the Z direction along the first movable rail 35. The support arm 33 having the picking head 31 attached thereto is attached such that the support arm 33 is movable, by the second movable rail 36, in a reciprocating manner in the Y direction. Thus, the transfer unit 3 can cause the picking head 31 in a reciprocating manner in three directions, i.e., the X, Y, and Z directions, by controlling operation of the driving section 32.

As compared to, e.g., a transfer unit of a six-axis robot, the transfer unit 3 has a simple structure and is easy to be adapted to a multi-row conveyor layout. Thus, by employing the transfer unit 3, it is possible to improve a degree of freedom in layout design of the transfer system 100.

As shown in FIG. 3, the first transfer position P11 and the second transfer positions P2A and P2B are set in a movable area, the movable area being a range in which the picking head 31 is movable in the X direction and the Y direction when seen in a plan view. Each of the first container C1 and the second container C2 has, e.g., a rectangular shape having a longitudinal direction when seen in a plan view. The first container C1 and the second container C2 are aligned in a line along the X direction in the movable area S such that their longitudinal directions extend in the Y direction. With this, during the automatic transfer, the transfer unit 3 can hold, with the picking head 31, articles W housed in the first container C1 located at the first transfer position P1, and can put the articles W into the second containers C2 located at the second transfer position P2A and the second transfer position P2B.

The transfer unit 3 is provided with a first imaging device 41, which is set above the first transfer position P11 and is configured to capture an image of an inside of the first container C1. Furthermore, the transfer unit 3 is provided with a second imaging device 42, which is set above the second transfer position P2A and is configured to capture an image of an inside of the second container C2. Moreover, the transfer unit 3 is provided with a third imaging device 43, which is set above the second transfer position P2B and is configured to capture an image of an inside of the second container C2. On the basis of imaging information from the first imaging device 41, the transfer unit 3 holds articles W housed in the first container C1 to take the articles W out of the first container C1. Moreover, on the basis of imaging information from the second imaging device 42, the transfer unit 3 puts, into the second container C2 located at the second transfer position P2A, the article(s) W taken out of the first container C1. Furthermore, on the basis of imaging information from the third imaging device 43, the transfer unit 3 puts, into the second container C2 located at the second transfer position P2B, the article(s) W taken out of the first container C1.

In the transfer system 100, working areas E are set at locations that are on the Y2 direction side relative to the transfer unit 3 and are on two opposite sides in the X direction of the first conveyor 1. Specifically, a working area EA is set at a portion of the movable area S which portion is on the Y2 direction side relative to the transfer unit 3 and on the X1 direction side relative to the first conveyor 1. Further, a working area EB is provided at a portion of the movable area S which portion is on the Y2 direction side relative to the transfer unit 3 and on the X2 direction side relative to the first conveyor 1. Each working area E is a space where the operator H stands to manually transfer an article W during the manual transfer. In the transfer system 100, the second conveyor 2 is laid out so that the second conveyor 2 is not provided on the Y2 direction side relative to the transfer unit 3 in order to secure the working areas E.

[Control of Transfer System 100]

Figure 4:
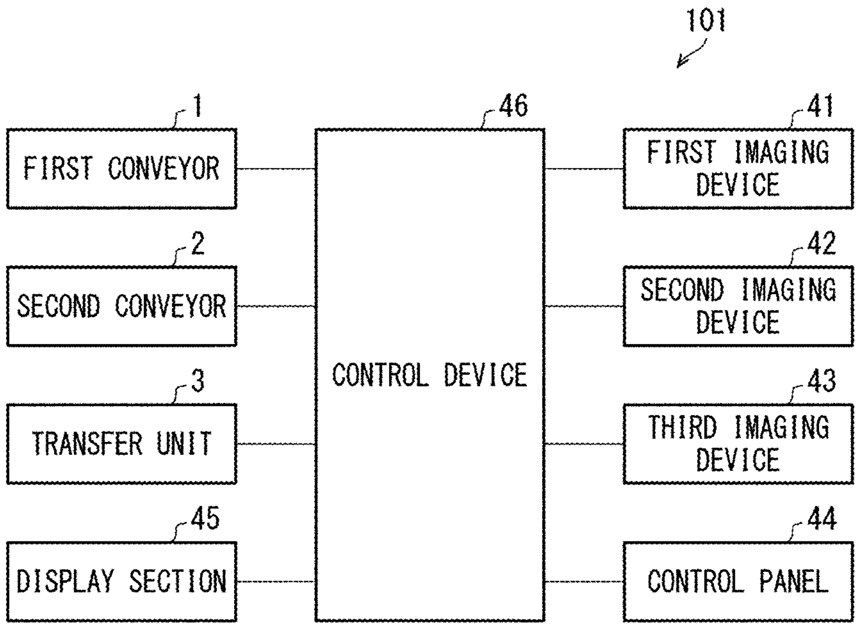
FIG. 4 is a block diagram of functional blocks of the transfer system.

Next, the following will describe control of the transfer system 100 with reference to FIGS. 1 and 4. FIG. 4 is a control block of the transfer system 100. As shown in FIG. 4, the transfer system 100 further includes: a control panel 44 used to manually operate the transfer unit 3; and a control device (transfer position changing section) 46 for controlling a display section 45 configured to display various information and various sections of the transfer system 100.

(Control During Automatic Transfer)

As shown in 1001 of FIG. 1, on the basis of picking information from a higher-order controller (not illustrated), a control device 46 controls the first conveyor 1 so that the first conveyor 1 delivers, to the first transfer position P11, a first container C1 in which an article(s) W that is/are to be transferred (i.e., a transfer-target article(s) W) is stored. Further, the control device 46 controls the second conveyor 2 so that the second conveyor 2 delivers an empty second container C2 to the second transfer position P2.

Subsequently, on the basis of the picking information and imaging information from the first imaging device 41, the control device 46 controls the transfer unit 3 so that the transfer unit 3 takes the article(s) W housed in the first container C1. Further, on the basis of the picking information and imaging information from the second imaging device 42 and the third imaging device 43, the control device 46 controls the transfer unit 3 so that the transfer unit 3 puts, into the second container C2, the article(s) W taken out of the first container C1.

Subsequently, the control device 46 controls the first conveyor 1 so that the first conveyor 1 (*i*) delivers, to the automatic warehouse, the first container C1 from which a required number of article(s) W has/have been taken out by the transfer unit 3 and (ii) delivers, to the first transfer position P11, a first container C1 having another transfer-target article(s) W housed therein. Then, on the basis of picking information and/or the like, the control device 46 controls the transfer unit 3 so that the transfer unit 3 puts the article(s) W, having been taken out of the first container C1, into the second container C2.

Subsequently, after putting all the required article(s) W into the second container C2, the control device 46 controls the second conveyor 2 so that the second conveyor 2 delivers the second container C2 having the article(s) W housed therein to a subsequent process.

(Control During Manual Transfer)

In switching operation of the transfer system 100 from the automatic transfer operation to the manual transfer operation, the operator H controls the control panel 44 so as to switch from the automatic transfer operation to the manual transfer operation, and then enters the working area E. In an example explained in the following description, one operator H carries out a transfer work in the working area EA. Note that, during the manual transfer, (i) one operator H may carry out a transfer work in the working area EB or (ii) two operators H may simultaneously carry out transfer works in the working area EA and the working area EB, respectively.

In a case where the control panel 44 accepts the operation for switching from the automatic transfer operation to the manual transfer operation, the control device 46 controls, on the basis of picking information from a higher-order controller (not illustrated), the first conveyor 1 so that the first conveyor 1 delivers a first container C1 having a transfer-target article(s) W stored therein to the first transfer position P12. Further, the control device 46 controls the second conveyor 2 so that the second conveyor 2 delivers an empty second container C2 to the second transfer position P2.

Subsequently, the control device 46 controls the transfer unit 3 so as to cause the picking head 31 to move to a standby position where the picking head 31 does not hinder a transfer operation of the operator H. For example, the control device 46 controls the transfer unit 3 so that the picking head 31 is on standby at an end portion of the movable area S which end portion is on the X direction side.

Furthermore, the control device 46 controls the display section 45 so that the display section 45 displays the picking information. Consequently, on the basis of the picking information displayed on the display section 45, the operator H takes the article(s) W housed in the first container C1 out of the first container C1, and puts the article(s) W into the second container C2. During this, the first container C1 stops at the first transfer position P12 which is downstream of the first transfer position P11 for the automatic transfer and which is outside the movable area S. Thus, the transfer unit 3 is not present above the first container C1 located at the first transfer position P12. Therefore, the transfer unit 3 would not hinder the operator H from taking the article(s) W out of the first container C1, and thus the workability in the manual transfer is improved.

Subsequently, the operator H inputs, to the display section 45, information indicating completion of a transfer work for transferring a required number of article(s) W that is/are to be housed in the first container C1. In a case where the display section 45 accepts the input operation, the control device 46 controls the first conveyor 1 so that the first conveyor 1 (*i*) delivers, to the automatic warehouse, the first container C1 from which the article(s) W has/have been taken out by the operator H and (ii) delivers, to the first transfer position P12, the first container C1 having another transfer-target article(s) W housed therein. Then, on the basis of the picking information displayed on the display section 45, the operator H takes the article(s) W housed in the first container C1 out of the first container C1, and puts the article(s) W into the second container C2.

Subsequently, after putting all the required article(s) W into the second container C2, the operator H inputs, to the display section 45, information indicating completion of all the transfer work(s) of the article(s) W. In a case where the display section 45 accepts the input operation, the control device 46 controls the second conveyor 2 so that the second conveyor 2 delivers the second container C2 having the article(s) W stored therein to a subsequent process.

[Effects of Transfer System 100]

As discussed above, the transfer system 100 in accordance with the present embodiment includes: the first conveyor 1 configured to deliver an article W to the first transfer position P1; the transfer unit 3 configured to transfer, to the second transfer position P2, the article W having been delivered to the first transfer position P1; the second conveyor 2 configured to deliver the article W having been transferred to the second transfer position P2; and the control device 46 configured to change the first transfer position P1 in switching between (i) the automatic transfer in which the article W is transferred by the transfer unit 3 and (ii) the manual transfer in which the article W is transferred by the operator.

According to the transfer system 100, during manual transfer, the first transfer position P1 can be changed from the first transfer position P11 to the first transfer position P12, where the transfer unit 3 hardly hinders the transfer work. Thus, according to the present embodiment, it is possible to provide the transfer system 100 that can improve workability in manual transfer during which an article is transferred by the operator H.

In particular, in a case where a structure for causing the picking head 31 to move in a reciprocating manner in three directions, i.e., the X, Y, and Z directions is employed as the transfer unit 3, a rail member, a frame member, or the like may sometimes be provided above the picking head 31 in the movable area S. Even in such a case, according to the above embodiment, the rail member, the frame member, or the like would not hinder the transfer work in which the operator H takes the article W out of the first container C1, thanks to the configuration in which the first transfer position P12 during the manual transfer is set at a location away from the transfer unit 3. Thus, an aspect of the present disclosure is suitably applicable to a transfer system including a transfer unit configured to cause the picking head 31 to move in a reciprocating manner in three directions, i.e., the X, Y, and Z directions. Alternatively, however, a six-axis robot or the like can be employed as the transfer unit 3.

In the configuration example discussed in the foregoing embodiment, the control device 46 changes the first transfer position P1 in switching between the automatic transfer and the manual transfer. The control device 46 may change at least one of the first transfer position P1 and the second transfer position P2. That is, the control device 46 may change the positon of the first transfer position P1 in switching between the automatic transfer and the manual transfer or the control device 46 may change the second transfer position P2 in switching between the automatic transfer and the manual transfer. Alternatively, the control device 46 may change both the first transfer position P1 and the second transfer position P2. In either of the cases, thanks to the configuration in which the first transfer position P1 and the second transfer position P are set at locations where the transfer unit 3 hardly hinders the transfer work of the operator H, it is possible to improve the workability in the manual transfer.

[Variations]

The following description will discuss variations of the transfer system 100 of the present disclosure with reference to FIGS. 5 to 9. For easy explanation, the same reference signs will be given to members each having the same function as a member described in the foregoing embodiment, and descriptions on such a member will be omitted.

(First Variation)

Figure 5:
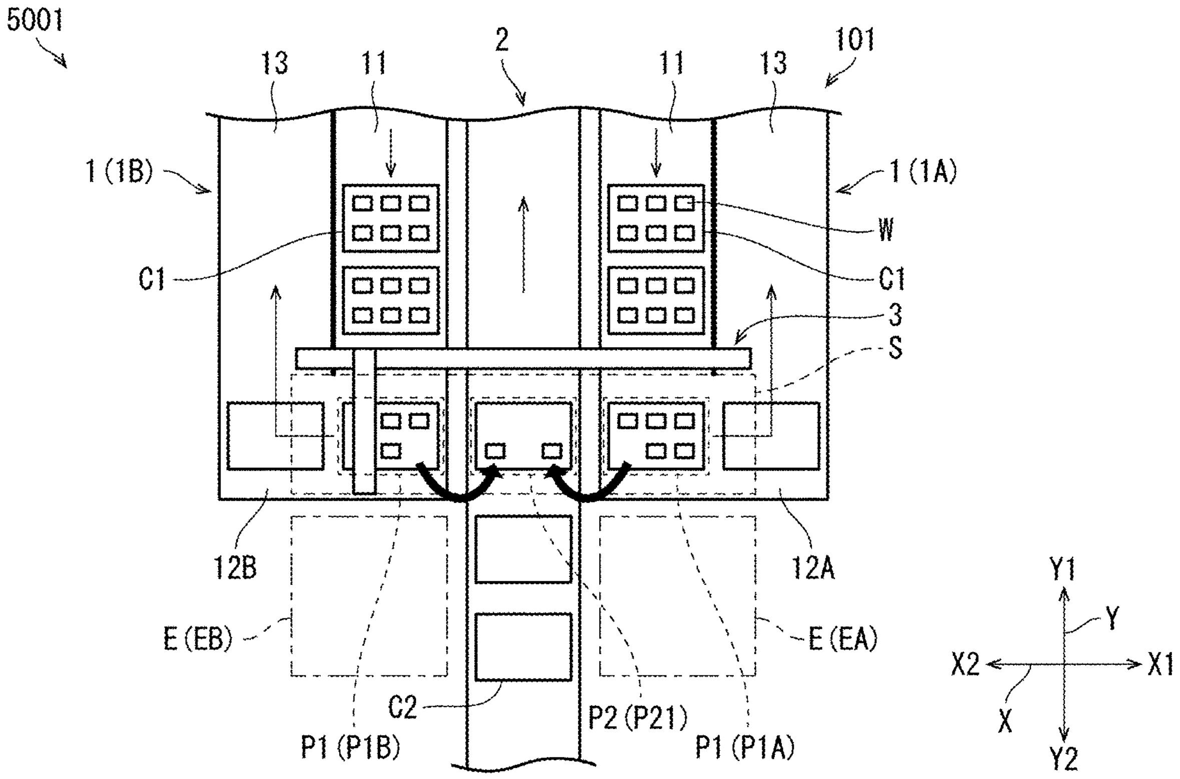
FIG. 5 is a plan view of a first variation of the transfer system.
Figure 5:
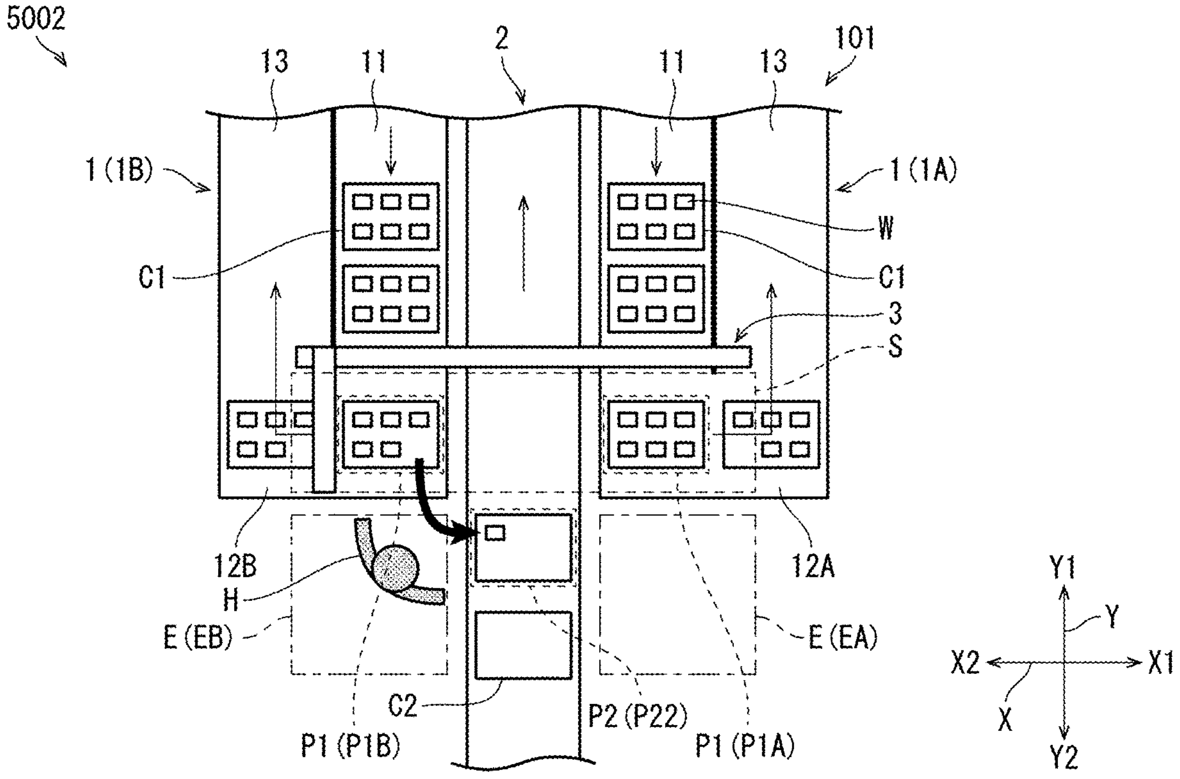

FIG. 5 is a plan view of a transfer system 101, which is a variation of the transfer system 100 shown in FIG. 1. 5001 of FIG. 5 illustrates an operation state during automatic transfer, whereas 5002 of FIG. 5 illustrates an operation state during manual transfer. The transfer system 101 differs from the transfer system 100 in accordance with the foregoing embodiment mainly in terms of that the transfer system 101 changes a second transfer position P2 in switching between the automatic transfer and the manual transfer.

As shown in 5001 and 5002 of FIG. 5, in the transfer system 101, a first conveyor 1A is provided so as to be adjacent to a second conveyor 2 on an X1 direction side, and a first conveyor 1B is provided so as to be adjacent to the second conveyor 2 on an X2 direction side, the second conveyor 2 extending in a Y direction.

As indicated by the arrows in FIG. 5, the first conveyor 1A includes: a first portion 11 configured to deliver a first container C1 in a Y2 direction; a second portion 12A configured to deliver the first container C1 in the X1 direction; and a third portion 13 configured to deliver the first container C1 in a Y1 direction. Further, the first conveyor 1B includes: a first portion 11 configured to deliver a first container C1 in the Y2 direction; a second portion 12B configured to deliver the first container C1 in the X2 direction; and a third portion 13 configured to deliver the first container C1 in the Y1 direction. The first conveyor 11A and the first conveyor 11B are provided such that delivery paths thereof are symmetric to each other in the Y direction across the second conveyor 2.

In the transfer system 101, as shown in 5001 of FIG. 5, a second transfer position P21 for the automatic transfer is set at a location between a first transfer position PIA and a first transfer position PIB in a movable area S. In the transfer system 101, a first container C1 and a second container C2 are aligned in a line along the X direction in the movable area S such that longitudinal directions of rectangular shapes of the first container C1 and the second container C2 extend along the X direction. Further, as shown in 5002 of FIG. 5, a second transfer position P22 for the manual transfer is set at a location downstream of the second transfer position P21 in a delivery direction of the second conveyor 2, that is, on the Y2 direction side.

As illustrated in 5002 of FIG. 5, according to the transfer system 101, during manual transfer, the second transfer position P22 is changed to a location downstream of the second transfer position P21 for the automatic transfer. Consequently, the transfer unit 3 is not present at a location above a second container C2 located at the second transfer position P22. Thus, the transfer unit 3 would not hinder an operator H in a working area E from putting an article W into the second container C2, which can improve the workability in the manual transfer.

(Second Variation)

Figure 6:
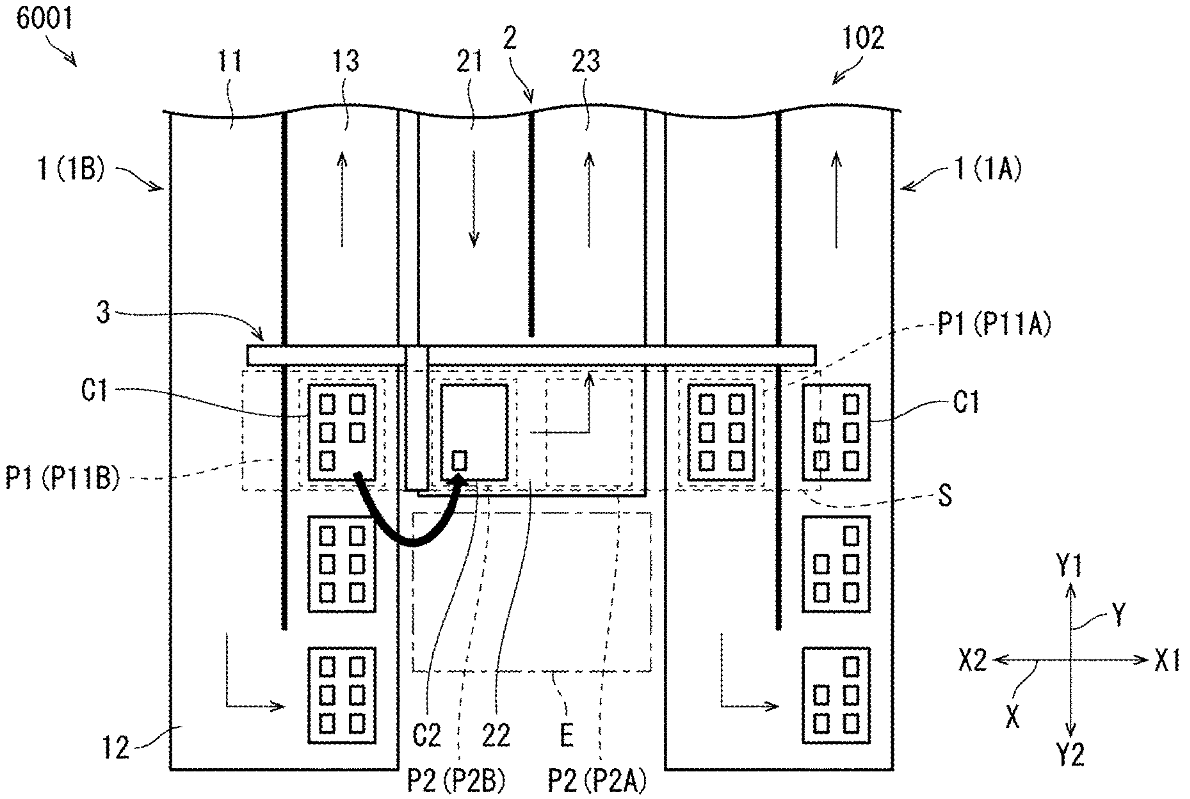
FIG. 6 is a plan view of a second variation of the transfer system.
Figure 6:
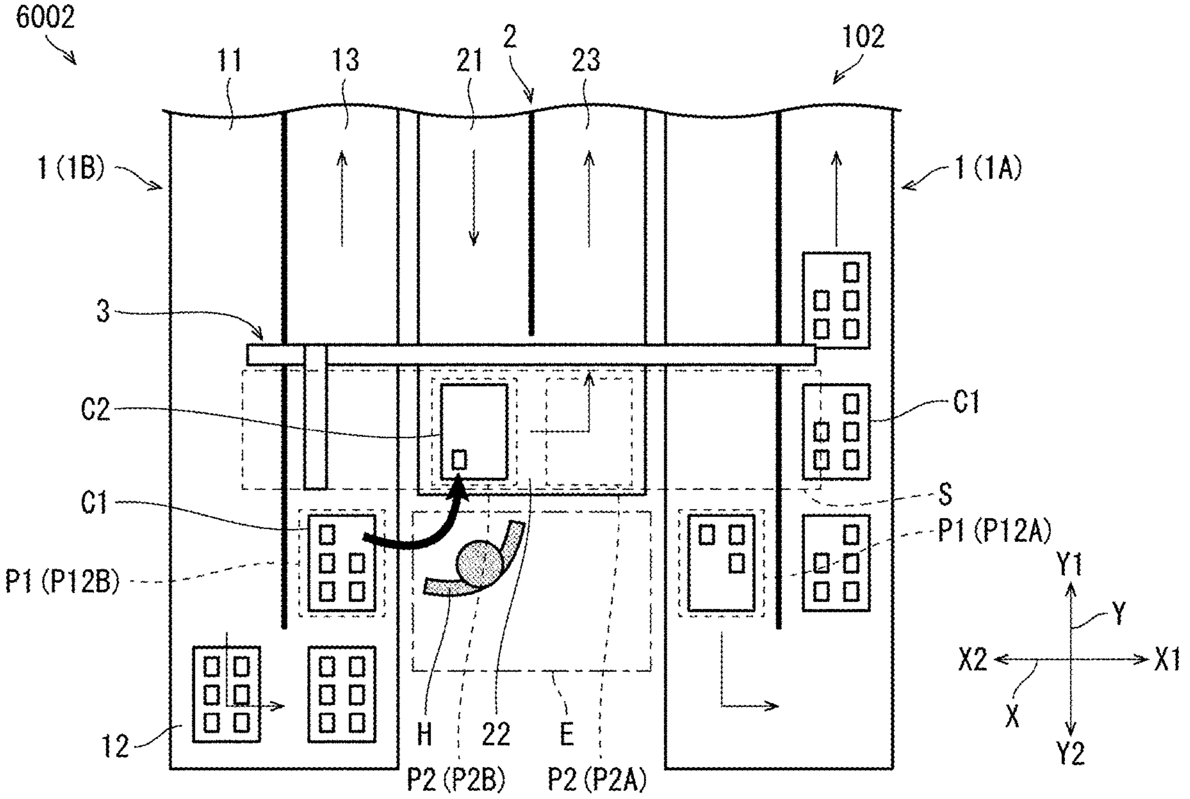

FIG. 6 is a plan view of a transfer system 102, which is a variation of the transfer system 100 shown in FIG. 1. 6001 of FIG. 6 illustrates an operation state during the automatic transfer, whereas 6002 of FIG. 6 illustrates an operation state during the manual transfer. The transfer system 102 differs from the transfer system n 100 in accordance with the foregoing embodiment mainly in terms of that, according to the transfer system 102, a first conveyor 1 and a second conveyor 2 are laid out so that a working area E is set between two first conveyors 1.

As shown in 6001 and 6002 of FIG. 6, in the transfer system 102, a first conveyor 1A is provided so as to be adjacent to the second conveyor 2 on an X1 direction side and a first conveyor 1B is provided so as to be adjacent to the second conveyor 2 on an X2 direction side. The first conveyor 1A, the first conveyor 1B, and the second conveyor 2 are identical in structure, and delivery paths of the first conveyor 1A, the first conveyor 1B, and the second conveyor 2 each makes a turn of 180 degree at an end potion on a Y2 direction side. The second conveyor 2 is provided such that, in a location between the first conveyor 1A and the first conveyor 1B, an end portion of the second conveyor 2 which end portion is on the Y2 direction side is shifted toward the Y1 direction side. Thus, in the transfer system 102, a working area E is set at a location that is on the Y2 direction side relative to the transfer unit 3 and is between the first conveyor 1A and the first conveyor 1B.

In the transfer system 102, as shown in 6001 of FIG. 6, the first transfer positions P11A and P11B for the automatic transfer are set at locations that are in a movable area S and on two opposite sides of the second transfer positions P2A and P2B. Further, as shown in 6002 of FIG. 6, a first transfer position P12A for manual transfer is set at a location downstream of a first transfer position P11A in a delivery direction of the first conveyor 1A, that is, on the Y2 direction side. Meanwhile, a first transfer position P12B for the manual transfer is set at a location upstream of a first transfer position P11B in a delivery direction of the first conveyor 1B, that is, on the Y2 direction side.

As illustrated in 6002 of FIG. 5, according to the transfer system 102, during the manual transfer, the first transfer position P12B is changed to a location upstream of the first transfer position P11B for automatic transfer. Consequently, the transfer unit 3 is not present at a location above a second container C2 located at the first transfer position P12B. Thus, the transfer unit 3 would not hinder an operator H in a working area EB from taking an article W out of the first container C1, which can improve the workability in the manual transfer.

(Third Variation)

Figure 7:
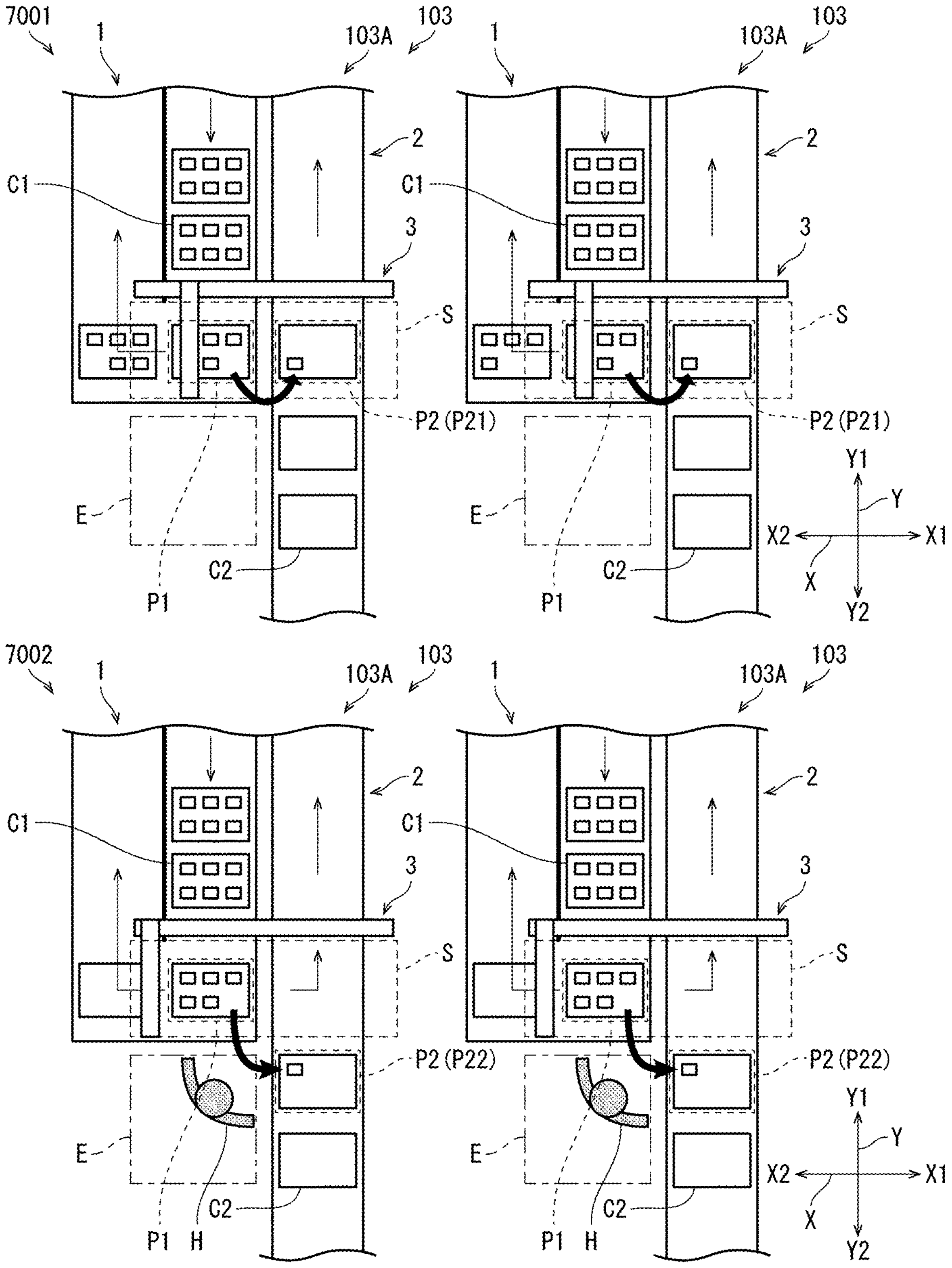
FIG. 7 is a plan view of a third variation of the transfer system.

FIG. 7 is a plan view of a transfer system 103, which is a variation of the transfer system 100 shown in FIG. 1. 7001 of FIG. 7 illustrates an operation state during automatic transfer, whereas 7002 of FIG. 7 illustrates an operation state during manual transfer. The transfer system 103 differs from the transfer system 100 in accordance with the foregoing embodiment mainly in terms of that the transfer system 103 includes a plurality of unit systems 103A.

As shown in 7001 and 7002 of FIG. 7, the transfer system 103 includes a plurality of unit systems 103A each constituted by a first conveyor 1, a second conveyor 2, and a transfer unit 3. The unit systems 103A are provided in parallel with each other along a Y direction.

In each of the unit systems 103A, the first conveyor 1 is provided so as to be adjacent to the second conveyor 2 on a X2 direction side, the second conveyor 2 extending along the Y direction. A delivery path of the first conveyor 1 makes a turn of 180 degrees at an end portion on the Y2 direction side.

In the transfer system 103, as shown in 7001 of FIG. 7, a second transfer position P21 for the automatic transfer is set at a location that is in a movable area S and on an X1 side relative to a first transfer position P1. Further, as shown in 7002 of FIG. 7, a second transfer position P22 for the manual transfer is set at a location upstream of the second transfer position P21 in a delivery direction of the second conveyor 2, that is, on the Y2 direction side.

As illustrated in 7002 of FIG. 7, according to the transfer system 103, during the manual transfer, the second transfer position P22 is changed to a location upstream, in the delivery direction of the second conveyor 2, of the second transfer position the P21 for automatic transfer. Consequently, the transfer unit 3 is not present at a location above a second container C2 located at the second transfer position P22. Thus, the transfer unit 3 would not hinder an operator H in a working area EB from putting an article W into the second container C2, which can improve the workability in the manual transfer. Moreover, since the transfer system 103 makes it possible to simultaneously carry out transfer works by the plurality of unit systems 103A, which makes it possible to carry out the transfer work more efficiently.

(Fourth Variation)

Figure 8:
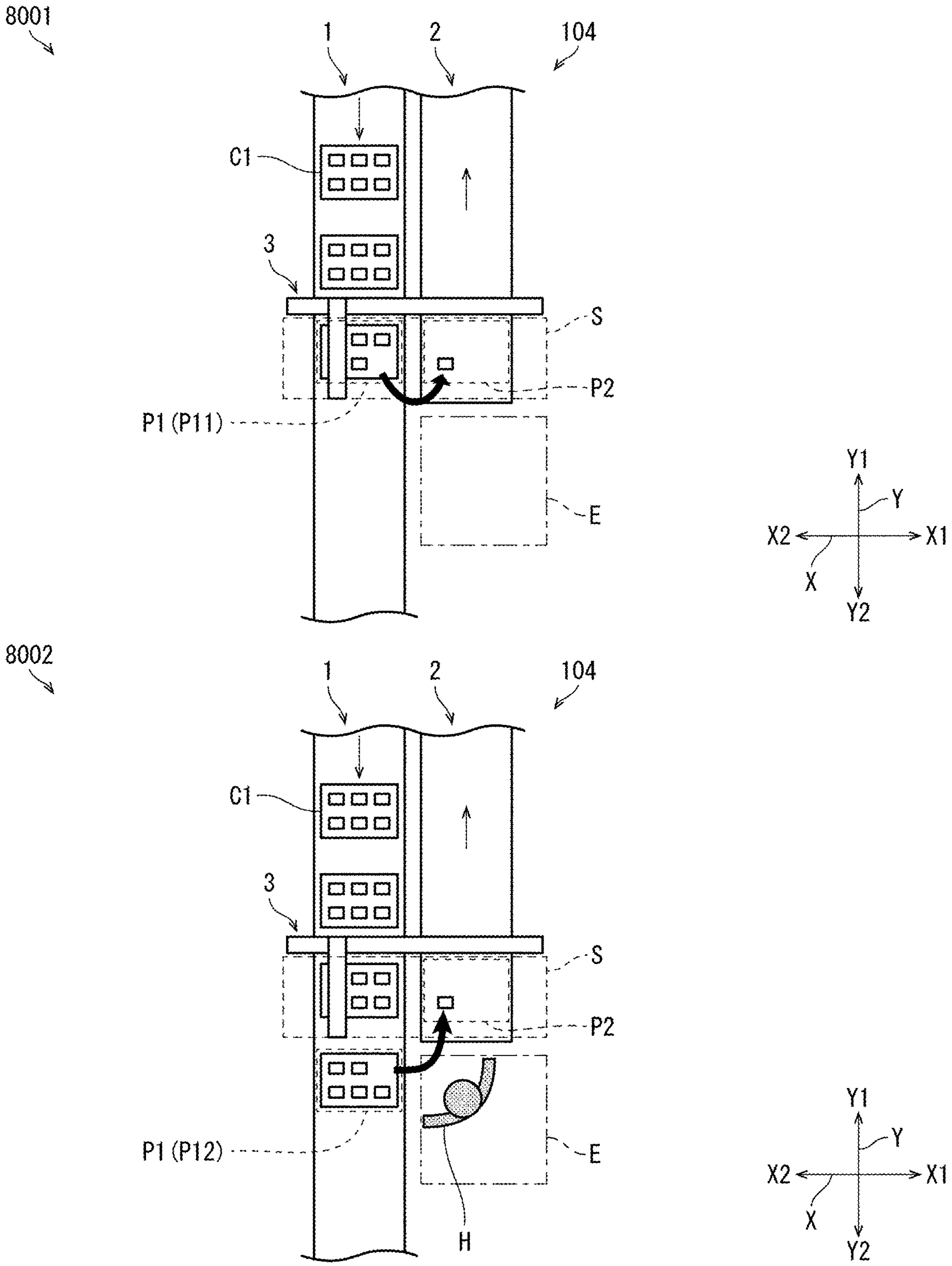
FIG. 8 is a plan view of a fourth variation of the transfer system.

FIG. 8 is a plan view of a transfer system 104, which is a variation of the transfer system 100 shown in FIG. 1. 8001 of FIG. 8 illustrates an operation state during automatic transfer, whereas 8002 of FIG. 8 illustrates an operation state during manual transfer. The transfer system 104 differs from the transfer system 100 in accordance with the foregoing embodiment mainly in terms of that, according to the transfer system 104, a second container C2 is not placed at a second transfer position P2 but an article W is directly placed on a second conveyor 2.

As shown in 8001 and 8002 of FIG. 8, in the transfer system 104, a second conveyor 2 is provided so as to be adjacent to a first conveyor 1 on an X1 direction side, the first conveyor 1 extending along a Y direction. As indicated by the arrows in 8001 and 8002 of FIG. 8, the second conveyor 2 delivers an article(s) W in a Y1 direction from the second transfer position P2, which is provided in parallel with the first conveyor 1 and which is set at a lower end portion on a Y2 direction side.

In the transfer system 104, the transfer unit 3 directly places an article(s) W on a placement surface of the second conveyor 2 located at the second transfer position P2. With the article(s) W being placed on the placement surface, the second conveyor 2 delivers the article(s) W having been transferred from the first container C1 to the second transfer position P2. Then, the second conveyor 2 puts the article(s) W into a second container C2 (not illustrated) arranged on the downstream side in the Y1 direction. Thus, according to the transfer system 104, it is possible to omit a delivery path for delivering the second container C2 to the second transfer position P2, thereby making it possible to simplify the structure of the second conveyor 2.

In the transfer system 104, as shown in 8001 of FIG. 8, a first transfer position P11 for the automatic transfer is set at a location that is in a movable area S and on an X2 side relative to the second transfer position P2. Further, as shown in 8002 of FIG. 8, a first transfer position P12 for the manual transfer is set at a location downstream of a second transfer position P21 in a delivery direction of the second conveyor 2, that is, on the Y2 direction side.

As illustrated in 8002 of FIG. 8, according to the transfer system 104, during the manual transfer, the first transfer position P12 is changed to a location downstream of the first transfer position P11 for the automatic transfer in a delivery direction of the first conveyor 1. Consequently, the transfer unit 3 is not present at a location above a first container C1 located at the first transfer position P12. Thus, the transfer unit 3 would not hinder an operator H in a working area E from taking an article(s) W out of the first container C1, which can improve the workability in the manual transfer.

(Fifth Variation)

Figure 9:
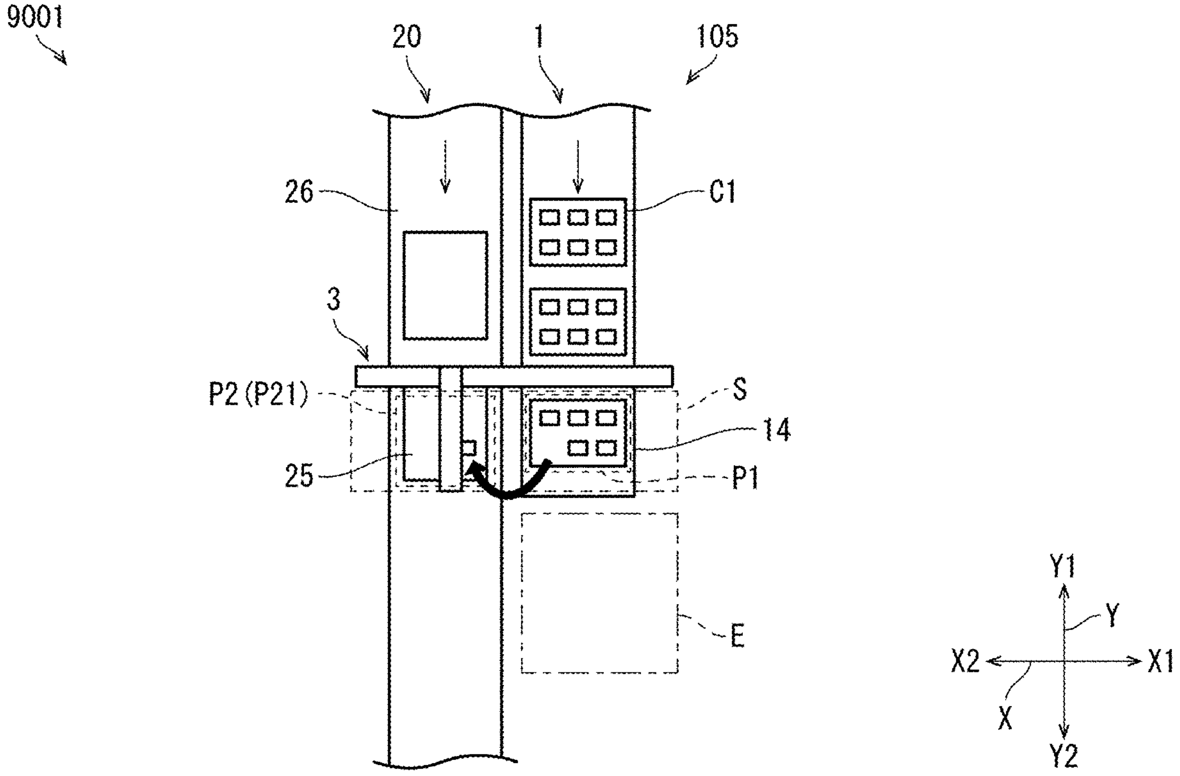
FIG. 9 is a plan view of a fifth variation of the transfer system.
Figure 9:
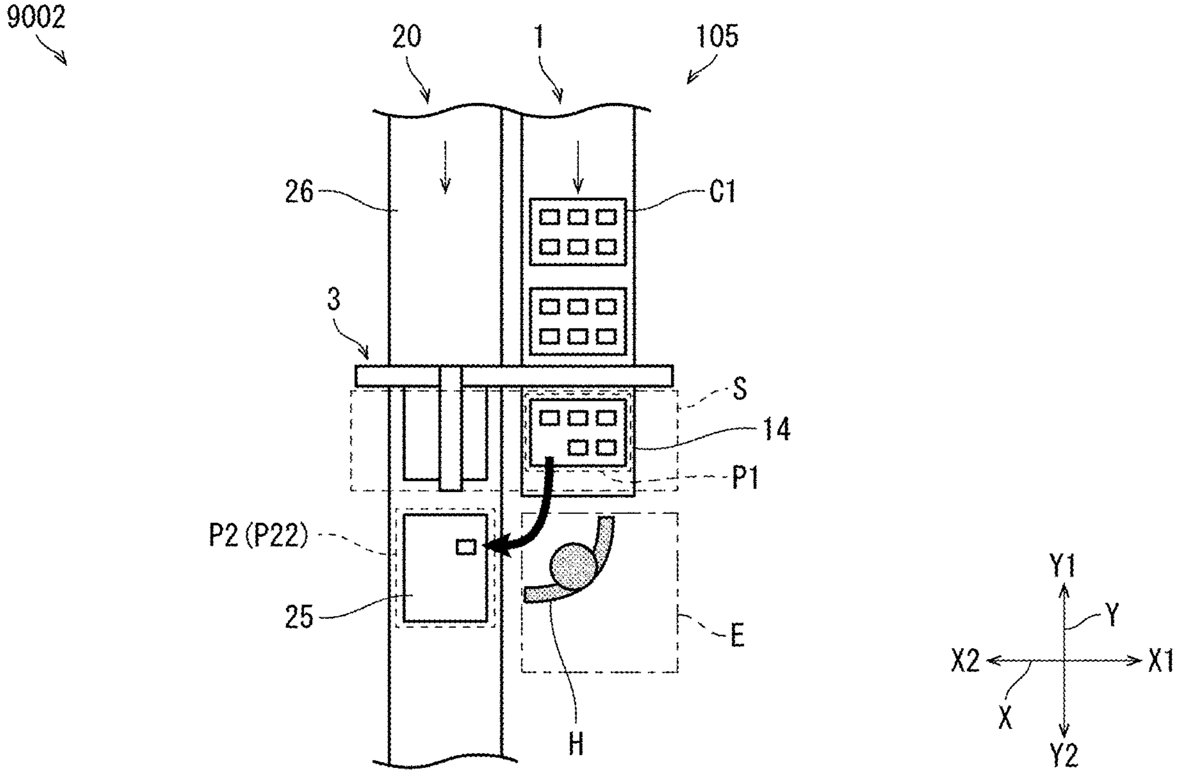

FIG. 9 is a plan view of a transfer system 105, which is a variation of the transfer system 100 shown in FIG. 1. 9001 of FIG. 9 illustrates an operation state during automatic transfer, whereas 9002 of FIG. 9 illustrates an operation state during manual transfer. The transfer system 105 differs from the transfer system 100 in accordance with the foregoing embodiment mainly in terms of that the transfer system 105 includes, in place of the second conveyor 2, an article delivery device 20 configured to deliver an article W by an automated guided vehicle 25.

As shown in 9001 and 9002 of FIG. 9, the transfer system 105 includes the article delivery device (second delivery section) 20 for delivering an article W having been transferred to a second transfer position P2. The article delivery device 20 includes: the automated guided vehicle 25 on which an article A can be placed; and a traveling path 26 along which the automated guided vehicle 25 travels. Traveling of the automated guided vehicle 25 is controlled on the basis of a control instruction from a control device 46.

In the transfer system 105, a first conveyor 1 is provided along a Y direction. The first conveyor 1 is constituted by two upper and lower stages. In the upper stage, a first container C1 is delivered in a Y2 direction. In the lower stage, the first container C1 is delivered in a Y1 direction. The first conveyor 1 has, at an end portion on the Y2 direction side, a lifting mechanism 14. The first container C1 from which an article W has been taken out is passed over from the upper stage to the lower stage via the lifting mechanism 14.

The traveling path 26 is provided so as to be adjacent to the first conveyor 1 on an X2 direction side, the traveling path 26 extending along the Y direction. The automated guided vehicle 25 travels over the traveling path 26 in the Y2 direction.

In the transfer system 105, as shown in 9001 of FIG. 9, a second transfer position P21 for the automatic transfer is set at a location that is in a movable area S and on a portion of the traveling path 26 which portion is on the X2 direction side relative to a first transfer position P1. Further, as shown in 9002 of FIG. 9, a second transfer position P22 for the manual transfer is set on a portion of the traveling path 26 which portion is on the Y2 direction side relative to the second transfer position P21.

As illustrated in 9001 of FIG. 9, during the automatic transfer, the control device 46 controls the first conveyor 1 so that the first conveyor 1 delivers a first container C1 to the first transfer position P1. Further, the control device 46 controls the automated guided vehicle 25 so that the automated guided vehicle 25 stops at the second transfer position P21 set on the traveling path 26.

Meanwhile, as illustrated in 9002 of FIG. 9, during the manual transfer, the control device 46 controls the automated guided vehicle 25 so that the automated guided vehicle 25 stops at the second transfer position P22 set on the Y2 direction side relative to the second transfer position P21. Consequently, the transfer unit 3 is not present at a location above the automated guided vehicle 25 located at the second transfer position P22. Thus, the transfer unit 3 would not hinder an operator H in a working area E from placing an article W onto the automated guided vehicle 25, which can improve the workability in the manual transfer.

As discussed above, according to the transfer system 105, the stop position of the automated guided vehicle 25 is changed in switching between the automatic transfer and the manual transfer. Consequently, it is possible to change the second transfer position P2.

Note that the traveling path 26 over which the automated guided vehicle 25 travels is not essential, and may be omitted. For example, the automated guided vehicle 25 may be configured so as to travel over a floor surface of in a provision space where the transfer system 105 is provided. In this case, a height of the automated guided vehicle 25 may be adjusted such that a height of the placement surface of the first conveyor 1 in the first transfer position P1 and a height of the placement surface of the automated guided vehicle 25 in the second transfer position P2 become substantially identical to each other.

The configuration example explained in the present variation employs the article delivery device 20 in place of the second conveyor 2. Further, the article delivery device 20 may be employed in place of the first conveyor 1 or the article delivery device 20 may be employed in place of the first conveyor 1 and the second conveyor 2.

Aspects of the present invention can also be expressed as follows:

A transfer system in accordance with a first aspect of the present invention includes: a first delivery section configured to deliver an article to a first transfer position; a transfer unit configured to transfer, to a second transfer position, the article having been delivered to the first transfer position; a second delivery section configured to deliver the article having been transferred to the second transfer position; and a transfer position changing section configured to change at least one of the first and second transfer positions in switching between (i) automatic transfer in which the article is transferred by the transfer unit and (ii) manual transfer in which the article is transferred by an operator.

According to the above configuration, during the manual transfer, it is possible to change at least one of the first and second transfer positions to, e.g., a position where the transfer unit hardly hinders the transfer work. Thus, according to the above configuration, it is possible to improve the workability in the manual transfer in which an article is transferred by an operator.

A transfer system in accordance with a second aspect of the present invention is configured such that, in the first aspect, the transfer position changing section changes at least one of the first and second transfer positions for the manual transfer to a position which is farther away from the transfer unit than the first and second transfer positions for the automatic transfer are.

According to the above configuration, at least one of the first and second transfer positions for the manual transfer is changed to a position which is farther away from the transfer unit than the first and second transfer positions for the automatic transfer are. Thus, with the above configuration, during the transfer unit, the transfer unit hardly hinders the transfer work.

A transfer system in accordance with a third aspect of the present invention is configured such that, in the second aspect, in changing the first transfer position, the transfer position changing section controls the first delivery section so that the first transfer position for the manual transfer is changed to a position which is upstream or downstream, in a delivery direction of the first delivery section, of the first transfer position for the automatic transfer; and in changing the second transfer position, the transfer position changing section controls the second delivery section so that the second transfer position for the manual transfer is changed to a position upstream or downstream, in a delivery direction of the second delivery section, of the second transfer position for the automatic transfer.

According to the above configuration, by controlling the first and second delivery sections, it is possible to easily change at least one of the first and second transfer positions to a position where the transfer unit hardly hinders the transfer work.

A transfer system in accordance with a fourth aspect of the present invention is configured such that, in the first to third aspect, the transfer unit includes a picking head configured to hold the article, and a driving section which supports the picking head so as to allow the picking head to be raised or lowered and which is configured to cause the picking head to move in two directions in a plan view.

According to the above configuration, the transfer unit can achieve a simpler structure than a transfer unit such as a six-axis robot, and can be adapted to a layout of a multi-row delivery sections. Therefore, the above configuration can improve a degree of freedom in layout design of the transfer system.

A transfer system in accordance with a fifth aspect of the present invention is configured such that, in the fourth aspect, the first and second transfer positions for the automatic transfer are located within a movable area of the picking head in a plan view; and at least one of the first and second transfer positions for the manual transfer is located outside the movable area.

According to the above configuration, at least one of the first and second transfer positions for the manual transfer is located outside the movable area of the picking head. Consequently, the transfer unit hardly hinders the transfer work.

A transfer system in accordance with a sixth aspect of the present invention is configured such that, in the first to fifth aspect, the first delivery section delivers, to the first transfer position, a first container having the article housed therein; and the transfer unit transfers, to the second transfer position, the article housed in the first container having been delivered to the first transfer position.

According to the above configuration, during the manual transfer, the first container having an article housed therein is positioned at a location where the transfer unit hardly hinders the transfer work. Consequently, it is possible to improve workability in the manual transfer.

A transfer system in accordance with a seventh aspect of the present invention is configured such that, in the first to sixth aspects, at least one of the first and second delivery sections includes an automated guided vehicle which is controlled by the transfer position changing section and which allows the article to be placed thereon.

According to the above configuration, by changing the stop position of the automated guided vehicle in switching between the automatic transfer and the manual transfer, it is possible to change at least one of the first and second transfer positions.

The present invention is not limited to the foregoing embodiments, but can be altered by a skilled person in the art within the scope of the claims. The present invention also encompasses, in its technical scope, any embodiment derived by combining technical means disclosed in differing embodiments.

REFERENCE SIGNS LIST

1, 1A, 1B: first conveyor (first delivery section)
2, 2A, 2B: second conveyor (second delivery section)
3: transfer unit

20: article delivery device (second delivery section)
46: control device (transfer position changing section)
100, 101, 102, 103, 104, 105: transfer system
C1: first container
E: working area
H: operator
P1: first transfer position
P2: second transfer position
P11: first transfer position for automatic transfer
P12: first transfer position for manual transfer
P21: second transfer position for automatic transfer
P22: second transfer position for manual transfer
S: movable area
W: article

The invention claimed is:

1. A transfer system comprising:

a first delivery section configured to deliver an article to a first transfer position;

a transfer unit configured to transfer, to a second transfer position, the article having been delivered to the first transfer position;

a second delivery section configured to deliver the article having been transferred to the second transfer position; and a transfer position changing section configured to change at least one of the first and second transfer positions in switching between (i) automatic transfer in which the article is transferred by the transfer unit and (ii) manual transfer in which the article is transferred by an operator.

2. The transfer system according to claim 1, wherein:

the transfer position changing section changes at least one of the first and second transfer positions for the manual transfer to a position which is farther away from the transfer unit than the first and second transfer positions for the automatic transfer are.

3. The transfer system according to claim 2, wherein:

in changing the first transfer position, the transfer position changing section controls the first delivery section so that the first transfer position for the manual transfer is changed to a position which is upstream or downstream, in a delivery direction of the first delivery section, of the first transfer position for the automatic transfer; and in changing the second transfer position, the transfer position changing section controls the second delivery section so that the second transfer position for the manual transfer is changed to a position upstream or downstream, in a delivery direction of the second delivery section, of the second transfer position for the automatic transfer.

4. The transfer system as set forth in claim 1, wherein:

the transfer unit includes a picking head configured to hold the article, and a driving section configured to raise or lower the picking head and to cause the picking head to move in two directions in a plan view.

5. The transfer system according to claim 4, wherein:

the first and second transfer positions for the automatic transfer are located within a movable area of the picking head in a plan view; and at least one of the first and second transfer positions for the manual transfer is located outside the movable area.

6. The transfer system according to claim 1, wherein:

the first delivery section delivers, to the first transfer position, a first container having the article housed therein; and the transfer unit transfers, to the second transfer position, the article housed in the first container having been delivered to the first transfer position.

7. The transfer system according to claim 1, wherein:

at least one of the first and second delivery sections includes an automated guided vehicle which is controlled by the transfer position changing section and which allows the article to be placed thereon.

* * * * *